Patented Feb. 13, 1923.

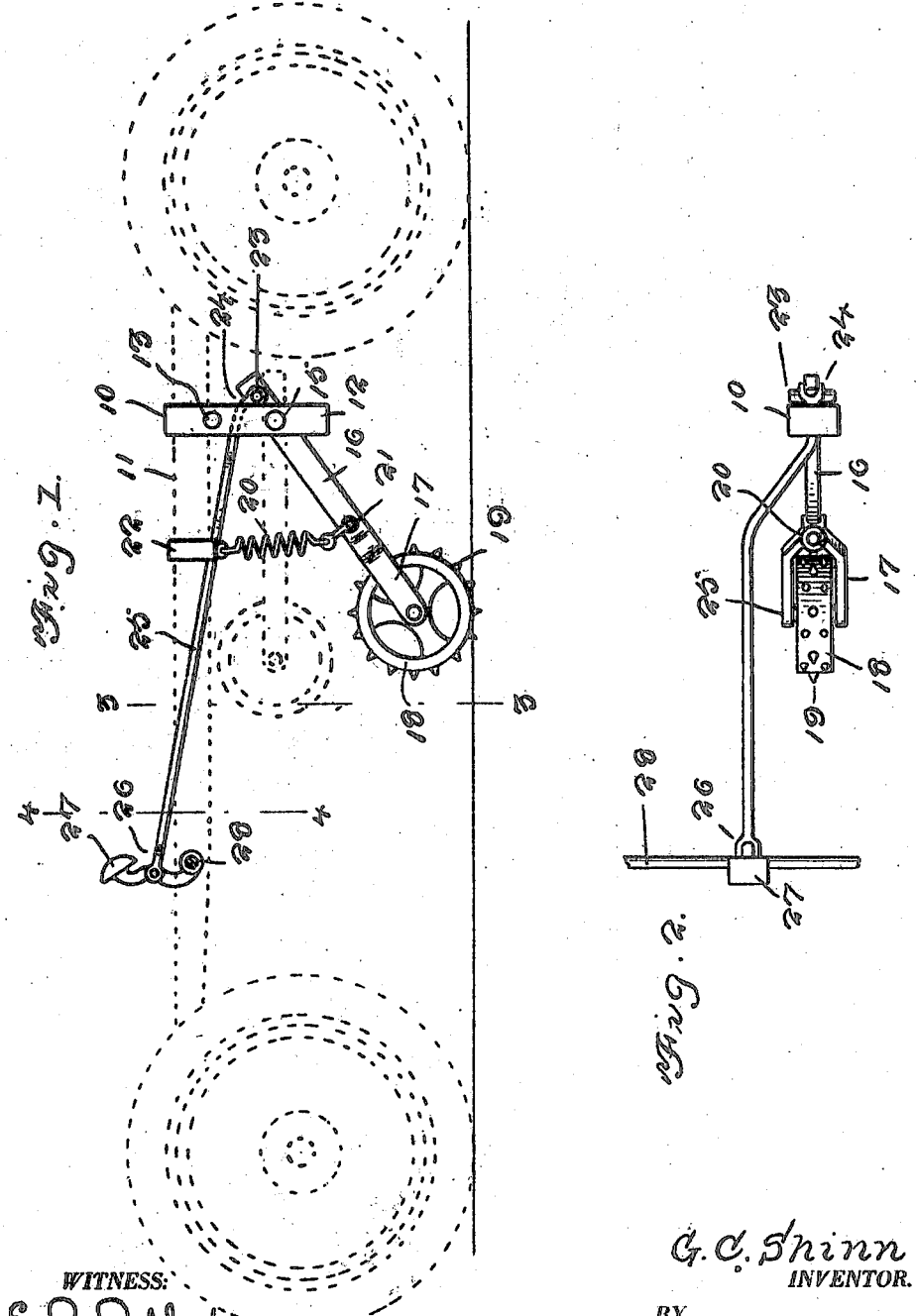

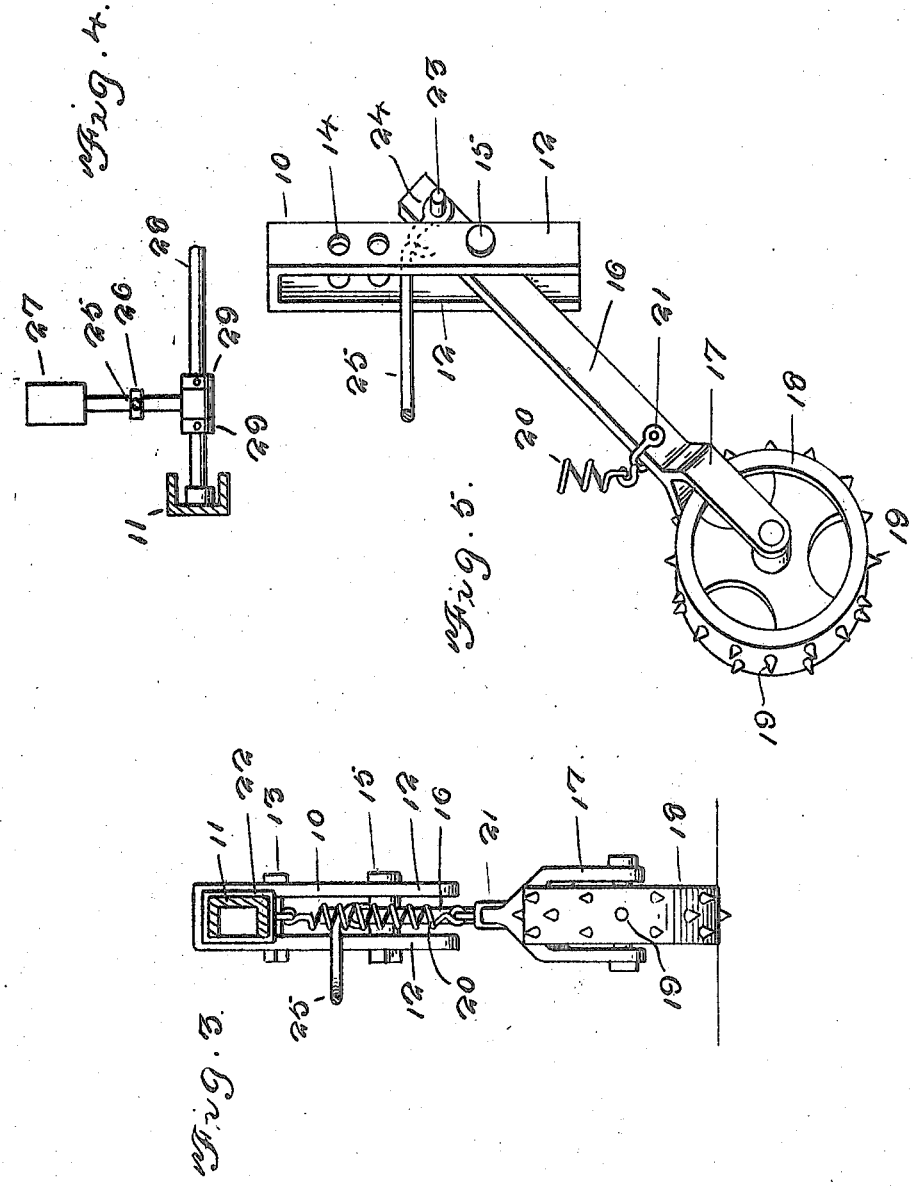

1,445,562

UNITED STATES PATENT OFFICE.

GEORGE C. SHINN, OF VANCOUVER, WASHINGTON.

ATTACHMENT FOR MOTOR VEHICLES.

Application filed August 9, 1919. Serial No. 316,345.

*To all whom it may concern:*

Be it known that I, GEORGE C. SHINN, a citizen of the United States, residing at Vancouver, in the county of Clarke and State of Washington, have invented new and useful Improvements in Attachments for Motor Vehicles, of which the following is a specification.

This invention relates to attachments for vehicles and has for an object the provision of a device, which may be easily and conveniently applied to a vehicle for the purpose of preventing skidding.

Another object of the invention is the provision of a novel form of attaching means, whereby the device may be secured to vehicles of different types, so as to permit of its being applied without the aid of a mechanic.

Another object is the provision of a device of this character, which is normally mounted out of contact with the road, but which may be quickly moved into such contact as soon as the vehicle begins to skid.

With the above and other objects in view, the invention consists of the following novel features and details of construction, to be hereinafter more fully described and illustrated in the accompanying drawings.

In the drawings:

Figure 1 is a side elevation, showing the application of the invention, the vehicle being shown by dotted lines or the device shown lowered, or in position for use by full lines and raised by dotted lines.

Figure 2 is a plan view of the device.

Figure 3 is an enlarged sectional view on the line 3—3 of Figure 1.

Figure 4 is a similar view on the line 4—4 of Figure 1.

Figure 5 is a detail view of the pivot lever and the road gripping member.

Referring in detail to the drawings, like characters of reference denote corresponding parts throughout the several views.

Referring to Figure 5 the invention is designed for application to motor operated vehicles of various types and designs, and as herein shown comprises a hanger 10, formed of substantially U-shaped metal adapted to be positioned over one of the side bars 11 of the vehicle frame. The hanger 10 is of such length as to depend or extend downward below the bar 10 to provide spaced arms 12, and is held against movement with respect to the side bar by means of a bolt 13, which passes through spaced aligned openings 14, formed in the hanger, the opening being so arranged as to adapt the hanger to frames of different sizes.

Pivotally mounted upon a bolt or pin 15, for movement between the arms 12, is a lever 16, this lever extending upon each side of the hanger 10 and being bifurcated at one end to provide a fork 17. Mounted for movement between the arms of the fork 17, is a rotatable member in the form of a wheel 18, from the periphery of which project spurs or studs 19, so as to form the road gripping member, which is adapted to dig into the surface of the road.

The member 18 is normally held from contact with the road surface by means of a spring 20, one end of which is secured to the lever 16, as indicated at 21, while the opposite end is secured to the side bar 11, by means of a collar 22, which surrounds the said bar.

The opposite ends of the lever 16 has secured therein a pin, which projects upon each side of the lever to form studs 23, and these studs have secured thereto, a yoke 24, which is connected to one end of a rod 25. The opposite end of this rod is connected to a similar yoke 26, which is carried by a foot pedal 27, the latter extending up through the floor of the car in convenient position for use by the driver of the vehicle. In addition to providing means for securing one end of the rod to the lever 16, the studs 23 provide a stop to limit the pivotal movement of the said lever in one direction and to prevent the member 18 from being moved to a position upon the opposite side of the hanger 10. The foot pedal 27 may be mounted in any convenient manner. For example, it may be pivoted upon the emergency brake cross rod, as shown at 28, and held against sliding movement upon the said rod by means of stop collars 29, placed upon the rod.

In the use of the device, the member 18 is normally held out of engagement with the road, as shown by the dotted position in Figure 1. When the car begins to skid, a pressure of the foot upon the pedal 27 will bring the member 18 into contact with the road, when the spurs 16 will dig into the road surface and immediately stop the skidding action of the vehicle.

The invention is susceptible of various changes in its form, proportions and minor details of construction and the right is herein reserved to make such changes as properly fall within the scope of the appended claim.

Having described the invention, what is claimed is:

The combination with a vehicle, of a U-shaped hanger engageable over one of the side bars of the vehicle frame and depending below said bar to provide downwardly extending spaced arms, means extending through said hanger and engaging the bar to hold the former in position, a lever pivotally secured between the spaced arms, a toothed rotatable member secured to one end of the lever for engagement with the road, a spring having one end secured to the lever, a collar engageable over the side bar of the vehicle frame for securing the opposite end of the spring to normally hold said rotatable member from contact with the road and manually operated means connected to the opposite end of the lever for moving said member into contact with the ground.

In testimony whereof I affix my signature.

GEORGE C. SHINN.